April 18, 1933.  H. B. CANNON  1,904,300

SIGNAL AND TROUBLE FINDER

Filed Oct. 21, 1930  2 Sheets-Sheet 1

Inventor
H. B. Cannon
By CA Snow & Co.
Attorneys.

April 18, 1933.　　　　　H. B. CANNON　　　　　1,904,300
SIGNAL AND TROUBLE FINDER
Filed Oct. 21, 1930　　　2 Sheets-Sheet 2
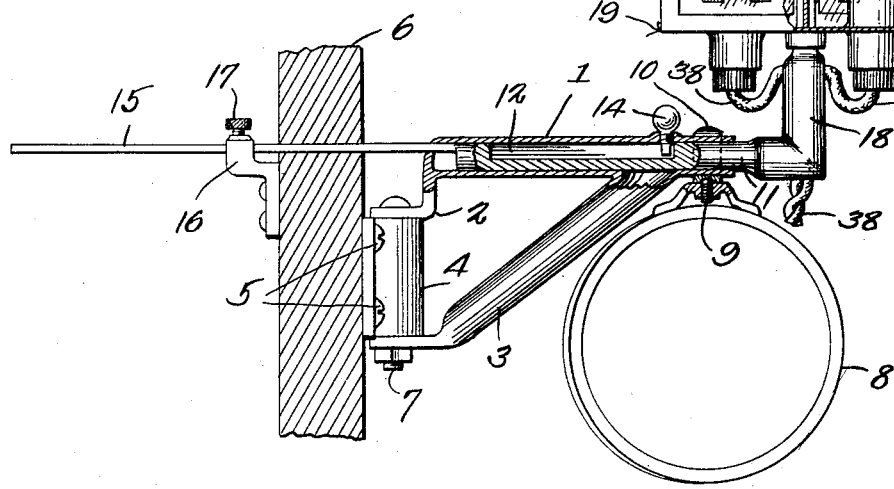
Fig. 3.
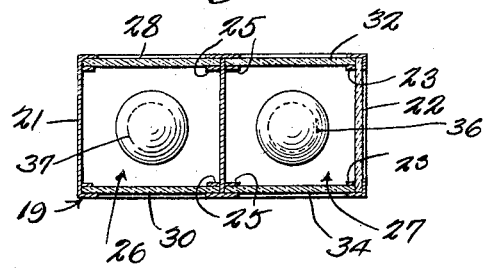
Fig. 4.
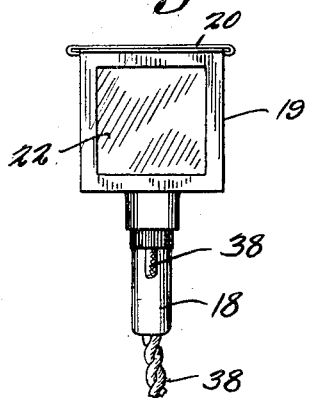
Fig. 5.
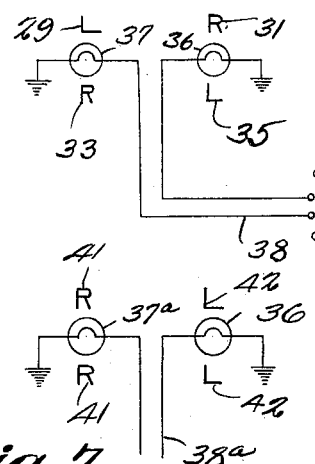
Fig. 6.
Fig. 7.
Inventor
H. B. Cannon
By C. A. Snow & Co.
Attorneys.

Patented Apr. 18, 1933

1,904,300

UNITED STATES PATENT OFFICE

HARRY B. CANNON, OF BRADFORD, PENNSYLVANIA

SIGNAL AND TROUBLE-FINDER

Application filed October 21, 1930. Serial No. 490,300.

This invention aims to provide a device, adapted to be mounted on an automobile, and to be used either as a signal, or as a lamp which can be taken to various parts of the automobile where trouble is encountered and where a light is required.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:

Figure 3 is a rear elevation;

Figure 4 is a horizontal section of the light box;

Figure 5 is an elevation showing the outer end of the light box;

Figure 6 is a diagram showing the circuit;

Figure 7 is a diagram showing a slightly modified form of the invention.

Figure 1:
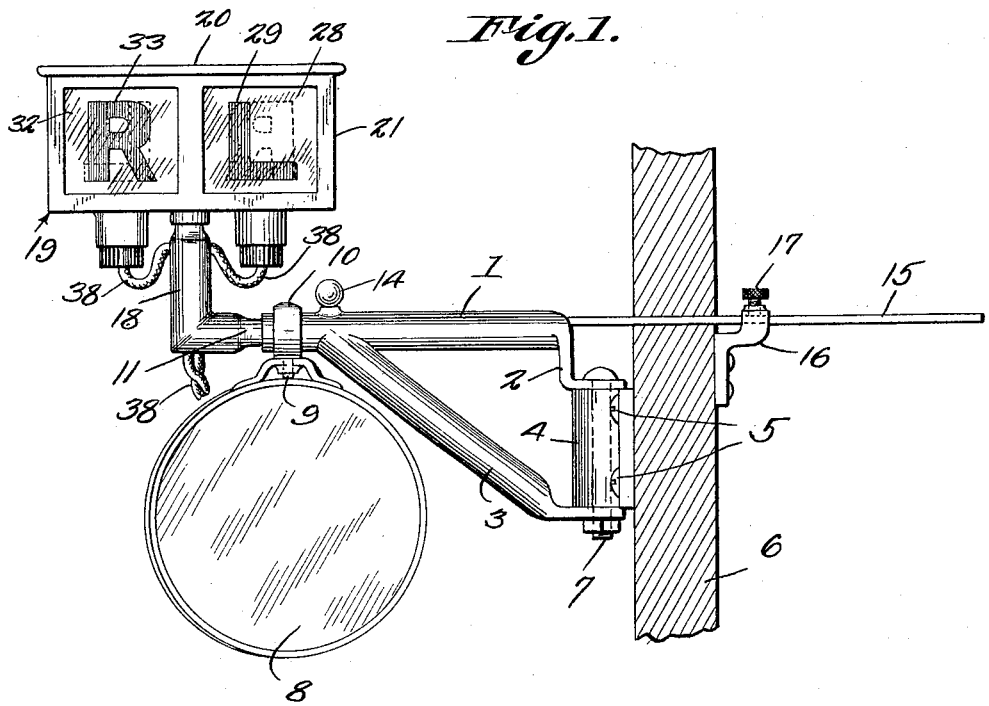
Figure 1 shows, in rear elevation, a device constructed in accordance with the invention.

In carrying out the invention, there is provided a horizontal tubular guide 1 provided at its inner end with a downwardly offset foot 2. A downwardly inclined brace 3 is connected to the outer end of the guide 1. The foot 2 extends above a vertical bracket 4, and the inner end of the brace 3 extends below the bracket 4. The bracket 4 is secured to the side 6 of a car, near to the driver's seat, in any desired way, as indicated at 5. A clamping bolt 7 is mounted vertically in the bracket 4 and engages the foot 2 and the brace 3 to hold the guide 1 in outstanding horizontal position with respect to the side wall of the car. If desired, the clamping bolt 7 may be mounted in the hinge of the door of the car, the bracket 4 then representing one of the hinge members.

Figure 2:
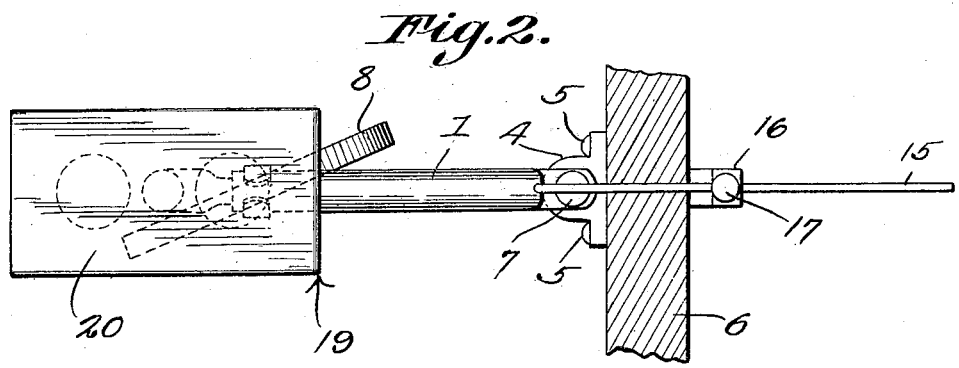
Figure 2 is a top plan.

The numeral 8 indicates a mirror into which the driver of the car may peer. The mirror 8 is arranged in depending position with respect to the tubular guide 1 and is adjustably secured at 9 to a collar 10 on the guide 1, so that the occupant of the car can turn the mirror into any desired position, as shown in Figure 2, so that the mirror can be seen by the driven of the car.

A slide rod 11 is mounted for limited straight-line reciprocation, in a horizontal position, in the tubular guide 1. The slide rod 11 has a guide slot 12, of any desirable length, into which extends a projection 14, carried by the guide 1. The projection 14 may be a screw. The function of the screw 14 is to prevent the slide rod 11 from turning, thereby to keep the lamps (hereinafter described) in an upright, vertical position.

The slide rod 11 has a thinned extension 15 which is slidably mounted in the foot 2, and, more specifically in the inner end of the tubular guide 1. The extension 15 is slidably mounted in the part 6 of the car body, and in a bracket 16 secured to the car body, there being a set screw 17 threaded into the bracket 16, the set screw engaging the extension 15 of the slide rod 11, to hold the extension 15, and therefore the slide rod 11, in any position to which they may have been adjusted horizontally, the extension 15 being accessible from within the car.

On the outer end of the slide rod 11 there is a vertical, upstanding tubular arm 18 on which is mounted a signal 19, in the form of a light box.

The signal or light box 19 has a removable lid 20, which may be slidably mounted, as shown in Figure 5. The inner end of the light box 19 is opaque, and is marked by the numeral 21 in Figure 4. The outer end of the light box 19 comprises a vertically removable slide 22 which may be of clear glass. It is only when the light box 19 is removed, to be used as a trouble finder, that the clear glass slide 22 is employed in the outer end of the signal or light box 19. When the signal or light box remains on the vehicle, as shown in Figure 1 and 3, the slide 22 is opaque, the showing of the drawings being the same, in either instance, aside from a matter of cross sectioning. The slide 22 is mounted in guides 23 on the front and on the back of the light box 19 and is held in place against upward movement by the slidably mounted lid 20.

A vertical transverse partition 24, which is opaque, is removably mounted in guides 25 (Figure 4) on the front and on the back of the light box 19. The partition 24 is disposed about midway between the inner and the outer ends of the light box 19, and forms an inner lamp compartment 26 and an outer lamp compartment 27.

The light box 19 includes a rear inner panel 28 which may be made of red glass, the panel 28 carrying the letter "L", as shown at 29. The light box 19 carries an inner, front panel 30, which may be made of clear glass. The panel 30 carries the letter "R", as shown at 31. The panel 28 forms the rear wall of the compartment 26, and the panel 30 forms the front wall of the compartment 26. An outer, rear panel 32 is carried by the light box 19 and may be made of red glass. The panel 32 carries the letter "R", as shown at 33. The light box 19 carries an outer, front panel 34, which, preferably, is made of clear glass. The panel 34 carries the letter "L", as shown at 35. The panel 32 forms the rear wall of the compartment 27, and the panel 34 forms the front wall of the compartment 27, all of which will be understood readily when Figure 4 of the drawings is noted.

An electric lamp 36 is carried by the light box 19 and is located in the outer lamp compartment 27. The lamp 36 illuminates the panels 32 and 34 and, therefore, the letters 31 and 35. An electric lamp 37 is carried by the light box 19 and is located in the inner lamp compartment 26. The lamp 37 illuminates the panels 28 and 30, and, therefore, the letters 29 and 33.

The lamps 36 and 37 are disposed in a circuit 38, the flexible wires of which may be of any desired length. The wires of the circuit 38 extend into an arm 18 of the slide rod 11, and out of the part 18, as shown in the drawings. In the circuit 38 is interposed a source of current, marked by the numeral 39. Switches 40 are interposed in the circuit 38. The circuit is shown in Figure 6, and is of so simple a construction that it need not be traced out in detail.

In practical operation, the operator can move either of the switches 40 to closed position, thereby lighting the lamps 36 or 37, one at a time, and illuminating the signal letters 35—31 or 33—29, in pairs, one pair at a time, so as to give signals to persons approaching the vehicle either from in front or from behind.

By loosening the set screw 17, the rod 11, and consequently the light box 19, may be moved in and out, to position the light box so that it will not extend out too far to the side, and the light box can also be reciprocated to attract attention to it. This sliding movement of the light box 19, in and out, with respect to the side wall 6 of the car, is brought about, from within the car, by means of the extension 15 of the slide rod 11, since the driver can grasp the part 15, within the car. After the desired adjustment has been obtained, the set screw 17 may be tightened down on the extension 15, to hold the light box in any position to which it has been adjusted. If the operator wishes to leave the set screw 17 loose, he can slide the light box 19 in and out, by means of the extension 15, to give a signal, whilst the car is being driven. The limits within which the light box can be slid in and out, as aforesaid, are determined by the removable projection or screw 14 which engages in the longitudinal guide slot 12 of the slide rod 11.

When the device is to be used as a trouble-finding lamp, the opaque slide in the outer end of the light box 19 is replaced by the clear glass slide 22, so as to afford illumination at the outer end of the light box, as well as through the clear glass panel 30 and through the clear panel 34. The operator slacks away the readily-removable set screw 14 and the set screw 17 and its extension 15 is withdrawn, it being possible to carry the slide and the light box 19 to any place where a light is desired, the switches being closed to light the lamps 36 and 37. The part 15 forms a support which can be inserted into the ground, to support the lamp box, when the device is used as a trouble lamp.

Although the letters have been shown at 29—33—31—35, it will be understood that any kind of devices may be used in the room of the letters. In Figure 6, the letters 29 and 35 are disposed diagonally with respect to each other and the same observation holds true with respect to the letters 31 and 33. In the modification shown in Figure 7 of the drawings, the circuit is indicated by the numeral 38a, and the lamps appear at 37a and at 36a. As shown at 42, the letters "L" are placed one in front of the other and the letters "R" are placed in the same manner in regard to each other. In general, the manufacturer can put any desired signals on the panels 28, 30, 32, and 34, and can arrange them as he desires. Although the panels and the part 22 have been mentioned as being made of glass, that substance may be replaced by any other appropriate material.

Having thus described the invention, what is claimed is:

1. In a device of the class described, an auto having a wall provided with a hole, a bracket on the inner surface of the wall and provided with a holding device, an outstanding guide, means for mounting the guide on the outside of the wall, a slide mounted removably and for reciprocation in the guide and having an inner end portion slidable in the hole and in the bracket and extended into the auto, the inner end portion being engageable by the holding means, the inner end portion constituting means whereby an operator, within the car, may reciprocate the slide, and a light box carried by the outer end of the slide and forming a signal which can be moved in and out by means of said end portion of the slide; the said inner end portion of the slide being in the form of a rod of materially less cross-sectional area than the slide, thereby reducing the size of said hole, and making said inner end portion of the slide readily insertible into the ground, when the slide is removed from the guide, whereby the light box may be used as a trouble-finding lamp, for which the slide and its aforesaid inner end constitute a ground-supported standard.

2. In a device of the class described, an auto having a wall provided with a hole, an outstanding guide, means for hinging the guide to the wall on the outside thereof, whereby the guide may be swung into parallelism with the wall when the guide is not in use, a slide mounted to reciprocate in the guide, and a signal on the outer end of the slide; the inner end of the slide extending through the hole and into the auto, to enable the slide and the signal to be reciprocated by an operator within the auto, the engagement of the slide in the hole serving to hold the guide in outstanding relation to the wall, the slide being removable from the guide and from the hole, thereby enabling the guide to be swung into parallelism with the wall, as aforesaid.

In testimony that I claim the foregoing as my own, I have hereto affixed my signature.

HARRY B. CANNON.